April 8, 1930.　　F. H. VAN HOUTEN　　1,753,393
DOUGH MOLDING MACHINE
Filed Sept. 17, 1926　　4 Sheets-Sheet 1

April 8, 1930.  F. H. VAN HOUTEN  1,753,393
DOUGH MOLDING MACHINE
Filed Sept. 17, 1926  4 Sheets-Sheet 2

Inventor
Frank H. Van Houten
By Churel Church
Attorneys

April 8, 1930. F. H. VAN HOUTEN 1,753,393
DOUGH MOLDING MACHINE
Filed Sept. 17, 1926 4 Sheets-Sheet 3
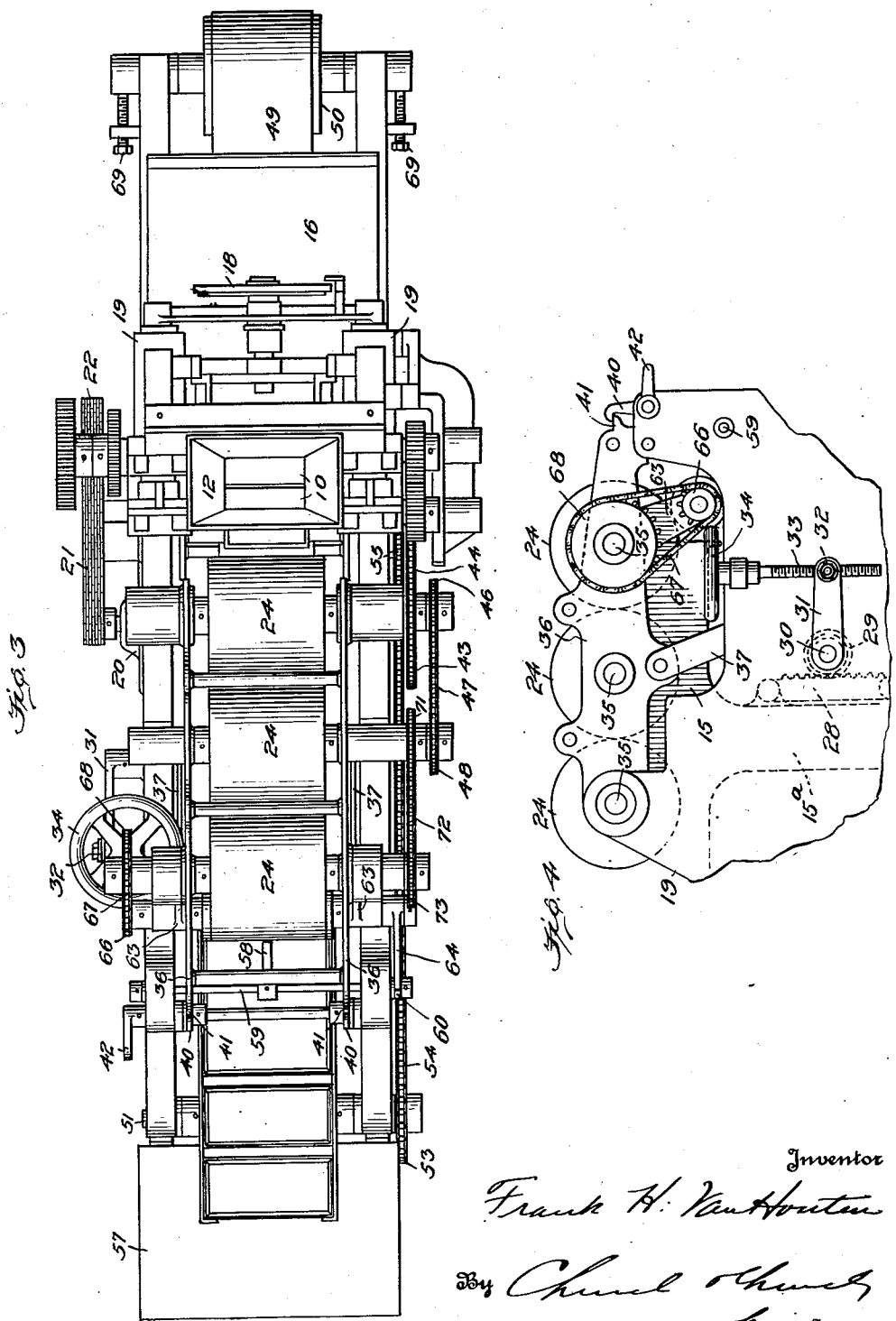
Inventor
Frank H. Van Houten
By Church & Church
his Attorneys April 8, 1930.  F. H. VAN HOUTEN  1,753,393
DOUGH MOLDING MACHINE
Filed Sept. 17, 1926   4 Sheets-Sheet 4
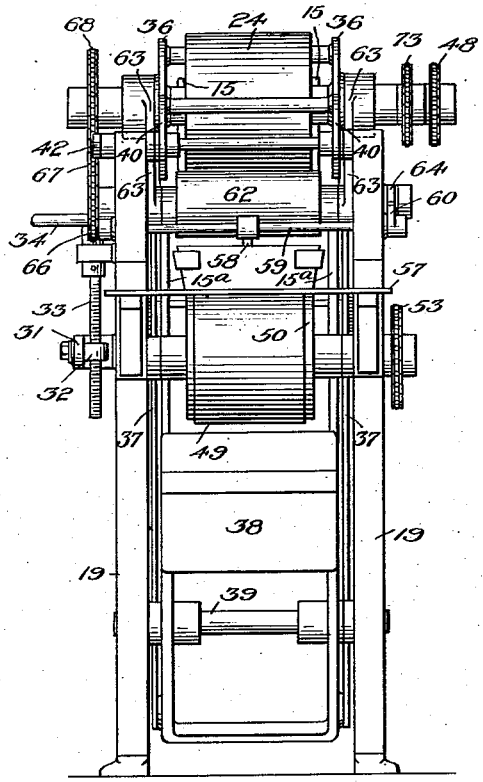
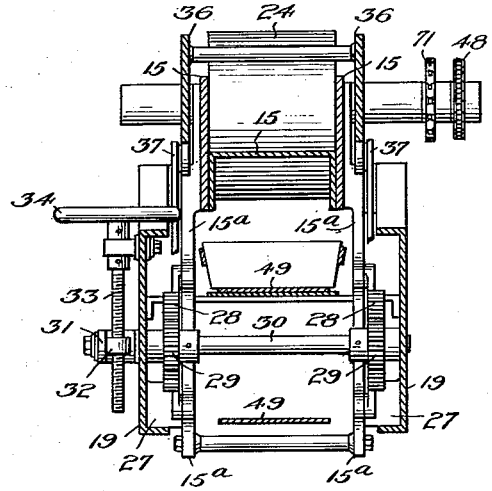
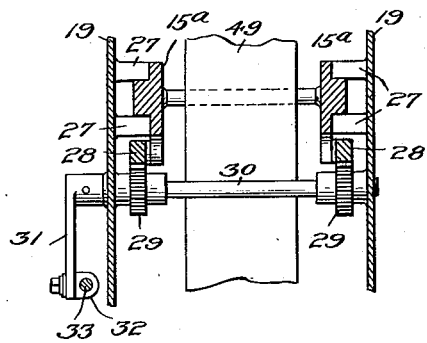
Inventor
Frank H. Van Houten
By Church & Church
his Attorneys Patented Apr. 8, 1930

1,753,393

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH-MOLDING MACHINE

Application filed September 17, 1926. Serial No. 136,121.

This invention relates to improvements in dough handling apparatus and particularly to the type of apparatus known as a dough molder.

In the molder shown in the present instance there is a series of drums and a pressure plate between which the lumps of dough to be molded are passed and one object of the present invention is to provide means whereby the space between the pressure plate and said drums may be regulated to properly accommodate different sizes of lumps of dough. Preferably, this variation in the space between the pressure plate and molding drums is taken care of by having the pressure plate adjustable toward and from the drums. With the movable pressure plate said space may not only be varied but by having the drums journaled in a swinging frame sufficient clearance may be had between the drums and plate to permit the latter to be readily washed and cleansed. In this connection a further object of the invention is to provide a simple and efficient locking mechanism for retaining the swinging frame carrying the molding drums in the position they occupy when the lumps of dough are being passed along the pressure plate in contact with the peripheries of said drums.

Another object of the invention is to provide an automatically operated mechanism for facilitating the panning of the lumps of dough while permitting the pans to be fed to and from their dough-receiving position by a continuously moving surface. This is accomplished by having means for periodically interrupting the movement of the pans while the surface carrying them moves continuously. Such an arrangement, especially the embodiment shown in the present instance, is much simpler and more economical to produce than would be a mechanism which operated to actuate the pan conveying member intermittently.

With these and other objects in view the present invention consists in certain novel details of construction and combinations and arrangements of parts all as will hereinafter be more fully described and the novel features thereof particularly pointed out in the appended claims.

In the accompanying drawings,—

Fig. 2 is a side elevation of the same side from which Fig. 1 is taken.

Fig. 3 is a top plan view of the entire machine.

Fig. 4 is a side elevation of a portion of the machine showing the molding rollers from the opposite side to that of Fig. 2.

Fig. 5 is an elevation of the left end of the machine taken from Fig. 2.

Figs. 6 and 7 are sectional views showing details, particularly of the elevating mechanism for the bottom pressure board.

Figure 1:
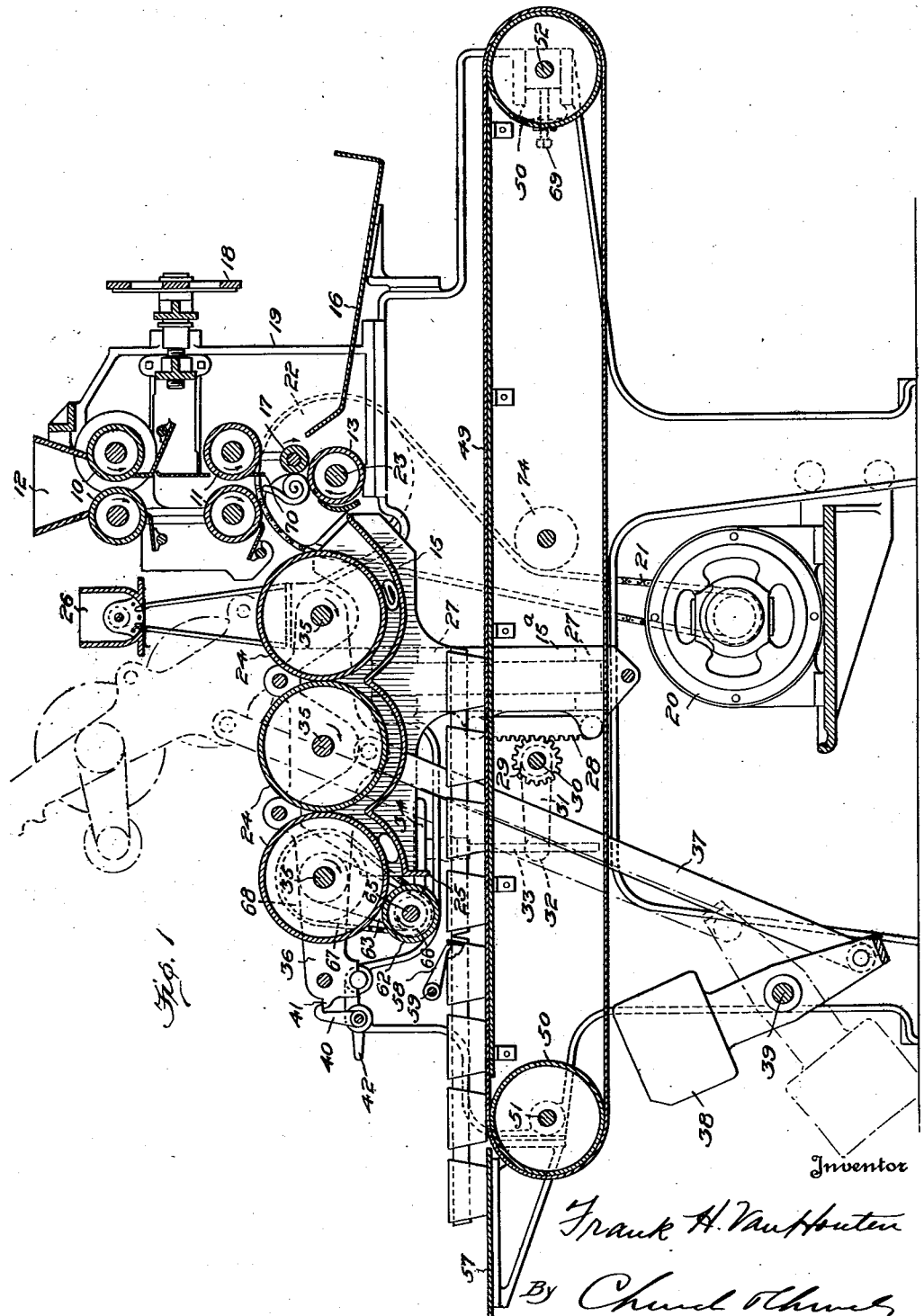
Figure 1 is a longitudinal sectional view of a dough molding apparatus embodying the present improvements.
Figure 2:
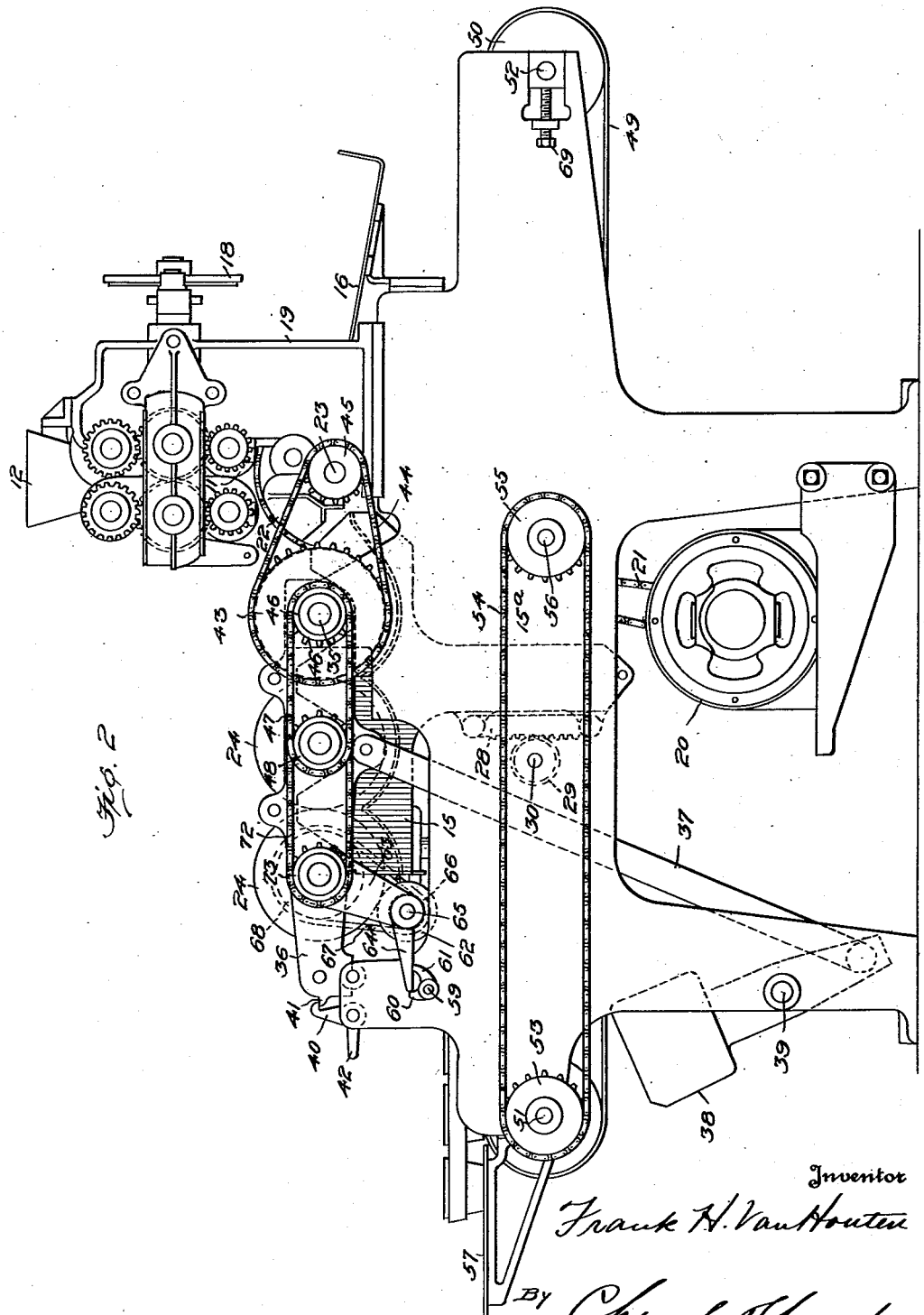

While the mechanism for delivering the dough to the molding drums and pressure plate may be of any desirable construction, that shown in the present instance consists of two sets of sheeting rollers, a pair of upper sheeting rollers 10 and a pair of lower sheeting rollers 11. The lumps of dough pass from the hopper 12 to and between the upper sheeting rollers and then downwardly between the rollers 11 and as the lowermost edge of the dough which has been formed into a sheet comes into contact with a curling roller 13 it is curled with also the aid of curling roller 17 into a series of convolutions as shown in Fig. 1. Should the resulting curled roll of dough be of the proper size for passage between the pressure plate and molding drums it will ultimately drop off of the curling roller 13 and onto the pressure plate 15. However, if such lump should be of excessive size, it will, after passing between rolls 11, be curled by roll 13, assisted by roll 17, and will continue to increase in diameter as it is rolled, until it strikes double catcher plate 70 which causes that portion of the roll to stop immediately, but as curling roll 17 is still in action, the dough is picked up by roll 17 and forced through the space between double catcher plate 70 and roll 17 and is deposited on plate 16. Through suitable mechanism which forms no part of the present invention the space between the sheeting rollers 10, 11 can be regulated at will by means of the hand wheel 18 journaled in the upper portion of the machine frame 19. These connections for adjusting the sheeting rollers as well as the driving connections for transmitting motion from the motor 20 to the sheeting rollers 10, 11, curling roller 13 and curling roll 17 are shown in the present instance, but as they form no part of this invention, reference for a detailed description of such connections is made to applicant's pending application Serial No. 105,179, filed April 28, 1926. Suffice it to say that motion is transmitted from the motor 20 by chain 21 to the sprocket wheel 22 on the shaft 23 of the curling roller 13. Through the various gears and idlers mounted on shaft 23 and the shafts of the other rollers thus far described motion is transmitted to the sheeting rollers and curling roller 17, all as fully shown and described in the pending application before referred to.

As the lumps of dough drop from the curling roller 13 onto the pressure plate 15 they come in contact with the peripheries of the drums 24 and are carried along the pressure plate by said drums until they are discharged at the opposite end of the pressure plate which is provided with a depending lip 25. In order to prevent the dough adhering to the drums 24 the surfaces of said drums are dusted with flour from the distributor 26 mounted in the upper portion of the frame at a point above the drums. It is desirable, of course, that the molder be capable of accommodating lumps of dough of various size, the size of the lumps passing through the machine at any one time depending upon the size and weight which it is desired the finished product shall possess. Consequently, the space between the pressure plate and the drums 24 must be variable, and while it would be possible to have the drums so mounted as to permit their being adjusted toward and from the pressure plate, it is preferred that the pressure plate be slidably mounted in the main frame of the machine in order that it may be moved toward and from the drums. For this reason the pressure plate frame composed of the depending side portions of said plate, indicated at 15ª, are retained in guides 27 in the main frame 19 of the machine, and carried by said pressure plate frame are racks 28 with which mesh gears 29 on shaft 30 journaled transversely of the machine frame. Shaft 30 is adapted to be rotated in its bearings so that the pressure plate frame may be moved up or down in its bearings through the gears 29 and racks 28. This is preferably accomplished by having a rocker arm 31 mounted on shaft 30 and a swivel connection 32 between the free end of said rocker arm and a screw 33 which is rotatable by means of a hand wheel 34 at a point near the exterior of the main frame. The connection 32 between the screw 33 and rocker arm 31 may be a swivel nut through which the screw is threaded and the screw may also be swiveled on the frame of the machine to permit it to compensate for the movement of the free end of the rocker arm 31 longitudinally of the machine.

These connections just described permit the pressure plate to be accurately adjusted toward and from the molding drums 24 in order that the machine may be used in connection with the molding of lumps of dough of different sizes. These adjusting movements of the pressure plate are, however, more or less limited so that it is hardly possible that sufficient clearance can be had between the plate and drums to give access to the plate for purposes of cleaning the same. In view of this it is preferred that shafts 35 carrying the drums 24 be journaled in a supplementary frame consisting of the side members 36 which are pivotally mounted in the main frame of the machine. These side members 36 for supporting the drums being pivotally mounted, they may be elevated as shown in dotted lines in Fig. 1, so that practically the entire dough supporting surface of the pressure plate 15 is exposed. To facilitate swinging this supplemental frame 36 the same is connected through straps 37 to the counterweight 38 pivoted at 39 on the frame 19. The drum supporting frame being pivoted, means must be provided for preventing the same to vibrate. To firmly lock said frame against such vibration cooperating locking elements are provided on the frame 36 and on the main frame 19. These locking members may consist of a latch 40 pivoted on the main frame and adapted to engage a catch 41 on the frame 36 when said frame is lowered to properly position the drums 24 in operative relation with respect to the pressure plate 15. When the latch and catch 41 are engaged it will be impossible for the frame 36 to vibrate to any extent or for the counterbalance to accidentally elevate the drums, but by exerting a downward pressure on the lever 42 of the latch 40 the latter may be disengaged from the catch and the drums elevated. For rotating the drums 24 shaft 35 of the drum nearest the curling roller is provided with a sprocket 43 which is connected by a chain 44 with a sprocket 45 on the shaft 23 of the curling roller and said shaft 35 carrying sprocket 43 also has mounted thereon a sprocket 46 which is connected by a chain 47 to sprocket 48 on the shaft 35 of the middle drum. Also, on shaft 35 of middle drum 24 carrying sprocket 48 is mounted another sprocket 71 which is connected by a chain 72 to sprocket 73 on shaft 35 of the remaining drum.

As the lumps of dough are discharged from the pressure plate at the depending lip 25 they must be panned and, while means might be provided for feeding the pans under the lip 25 with an intermittently operated mechanism whereby one of the pans would be held stationary at the proper point to receive a lump of dough dropping off of the pressure plate, it is preferred that the means for moving the pans be a continuously operating mechanism on account of the economy in the cost of the production of the of the latter and because of the vibrations which would be set up in the machine by the starting and stopping of the intermittently operating mechanism.

The preferred arrangement for panning the dough comprises a continuously moving pan supporting surface such as the endless belt 49 passing around the rolls 50 mounted on shafts 51, 52 journaled in the main frame 19, said roll 50 on shaft 51 being driven by a sprocket 53 on shaft 51, chain 54 and sprocket 55 which is mounted on shaft 56. Also on shaft 56 and on the end opposite to sprocket 55 is mounted a silent chain wheel 74 with which the chain 21 engages. The pans, which are placed on the upper reach of belt 49 at a point below double catcher 16, are conveyed toward the lip 25 of the pressure plate at which point the movement of each successive pan is momentarily interrupted while the same is being charged with a lump of dough. The belt 49 continues to travel on rolls 50 while the pan is held stationary beneath the discharge point of the pressure plate and after a lump of dough has been deposited in said pan, it will remain in that position until the next successive lump of dough is about to be discharged from lip 25, whereupon said next succeeding lump of dough will actuate connections hereinafter described which will release the previously charged pan. This charged pan will then move forward and another empty one brought to charging position beneath lip 25. Preferably the pans are arranged in what are termed nests, a nest usually consisting of four pans strapped or connected together, but positioned in spaced relation as shown in Fig. 1. When the pans are arranged in nests, as shown, it will be understood that the entire nest of pans must be charged with dough before they will be conveyed by belt 49 to the plate 57. In the present instance the mechanism for interrupting the movement of the pans comprises a stop, such as a finger 58 mounted on a rock shaft 59 having a rock arm 60 and a release finger 61 also mounted thereon. The stop 58 normally drops by gravity to the position shown in Fig. 1 for holding the pans to be charged stationary, said stop preferably engaging the side wall of one of said pans which will arrest the movement of all of the succeeding empty pans, one of which will be positioned beneath lip 25. To release the pans as the dough is deposited in the pan in charging position there may be provided a roller 62 carried by a frame 63 pivoted on the drum frame 36 so as to permit said roller 62 to swing toward and from lip 25. Normally roller 62 is slightly spaced from said lip. As a lump of dough passes downward between the roller and lip, said roller is moved toward shaft 59 and an arm 64 carried by said shaft 65 of said roller 62 will engage the rock arm 60 and rock shaft 59 with the result that stop 58 will be elevated and disengaged from the pan. The pans are then free to travel with belt 49, but as lever 64 engages finger 60 and elevates arm 58, finger 61, being part of finger 60, is also raised and engages lever 64 with the result that lever 64 is disengaged from finger 60 immediately arm 58 has been elevated far enough to clear the pan. Arm 58 being released, therefore, immediately drops to its former position and holds the next pan in a fixed position until the lump of dough has been deposited and until the next lump of dough to be discharged again acts on roll 62. To facilitate passage of the lumps of dough through the space between lip 25 and roller 62 the shaft 65 of said roller has a sprocket 66 mounted thereon and said sprocket is connected by chain 67 to a sprocket 68 on the shaft 35 of one of the molding drums 24 to drive roller 62 in the direction of the arrow in Fig. 1. The pan conveying belt 49 can be maintained under proper tension, the shaft of one of rollers 50 being journaled in a bearing which is adjustable as by a screw 69 toward and from the shaft of the other belt supporting roller.

What I claim is:

1. In a dough molding machine, the combination of a main frame, a series of drums journaled in said frame, a pressure plate carried by said main frame and having a dough supporting surface along which the dough travels while being operated upon by said drums, a shaft journaled in said frame, a gear on said shaft, a rack carried by the pressure plate and meshing with said gear, a rock arm fixedly mounted on said shaft, and a screw connected to said arm for rocking said shaft whereby the dough supporting surface of the pressure plate may be adjusted toward and from the peripheries of said drums.

2. In a dough molding machine, the combination of a main frame, a series of rotatable drums, a pressure plate beneath said drums, said plate being slidably mounted in the main frame, a rack carried by said plate, a shaft journaled in said frame, a gear on said shaft engaging said rack, and a screw operated arm fixedly mounted on said shaft for rotating the same to slide said pressure plate toward and from said drums.

3. In a dough molding machine, the combination of a main frame, a series of rotatable drums, a pressure plate beneath said drums, said plate being slidably mounted in the main frame, a rack carried by said plate, a shaft journaled in said frame, a gear on said shaft engaging said rack, an arm fixedly mounted on said shaft, a screw having a swivel connection with said arm, and means for rotating said screw whereby said arm will rotate said shaft and slide the pressure plate toward and from said drums.

4. In a dough molding machine, the combination of a main frame, a pressure plate slidable in the main frame and having a dough supporting surface, a pivoted drum supporting frame carried by the main frame, a series of drums journaled in said pivoted frame, said pivoted frame being movable toward and from the pressure plate, and interlocking elements on said main frame and pivoted drum frame for holding the latter in position for the drums to engage lumps of dough passing along the pressure plate.

5. In a dough molding machine, the combination of a main frame, a pressure plate slidable in the main frame and having a dough supporting surface, a pivoted drum supporting frame carried by the main frame, a series of drums journaled in said pivoted frame, said pivoted frame being movable toward and from the pressure plate, a latch on one of said frames and a cooperating catch on the other frame for releasably locking the drum supporting frame in position for said drums to engage lumps of dough passing along the pressure plate.

6. In a dough molding machine, the combination of a main frame, a pivoted drum supporting frame on the main frame, a series of drums journaled in the pivoted frame, a pressure plate slidably mounted in the main frame and having a dough supporting surface beneath said drums, means for adjusting the pressure plate toward and from the drums, and releasably locking means for holding the pivoted drum frame in position for the drums to engage lumps of dough passing along the pressure plate.

7. In a dough molding machine, the combination of a main frame, a pivoted drum supporting frame carried by the main frame, a series of drums journaled in said pivoted frame, a pressure plate beneath said drums and slidable in said main frame, interlocking elements on the main frame and drum frame for releasably holding the latter in position for the drums to engage lumps of dough passing along the pressure plate, a shaft journaled in the main frame, a rack carried by the pressure plate, a gear on said shaft meshing with said rack, a rock arm on said shaft, and means for oscillating said rock arm to rotate said shaft and gear.

8. In a dough molding machine, the combination of a plurality of dough molding elements between which lumps of dough are passed, a continuously moving surface for supporting a series of receptacles into which said lumps of dough are deposited, a stop for holding one of said receptacles stationary on said moving surface to receive a lump of dough, and means operable by a lump of dough for actuating said stop to release said receptacle whereby it will be conveyed from its dough receiving position by said continuously moving surface, said stop and said actuating means therefor being located entirely above said surface.

9. In a dough molding machine, the combination of a plurality of dough molding elements, a continuously moving surface for conveying a series of pans to and from a position to receive lumps of dough discharged from said molding elements, and means located entirely above said surface for holding said pans stationary on said moving surface in their dough receiving position, said means being releasable by a lump of dough passing from the molding elements to the pans to permit said continuously moving surface to successively convey the pans from their dough receiving position after a lump of dough has been deposited therein.

10. In a dough molding machine, the combination of a plurality of dough molding elements, a continuously moving surface for carrying a series of pans to and from a position to each receive a lump of dough from said molding elements, a pivoted stop adapted to successively hold the pans stationary on said moving surface in position to receive a lump of dough, and means operable by a lump of dough discharged from said molding elements for rocking said stop to release each pan after it has received a lump of dough said last mentioned means and said stop being located entirely above said surface.

11. In a dough molding machine, the combination of a plurality of dough molding elements, a continuously moving surface for carrying a series of pans to and from a position to each be charged with a lump of dough from said molding elements, a stop adapted to successively engage the pans to hold one of the pans stationary on said moving surface in position to be charged with a lump of dough, and means deflectable by the lumps of dough while in transit from the molding elements to the pans for initially engaging said stop and releasing a pan each time one of said pans is charged with a lump of dough, said means being disengaged from said stop upon continued deflection thereof by a lump of dough.

12. In a dough molding machine, the combination of a plurality of dough molding elements, a continuously moving surface for carrying a series of pans to and from a position to each be charged with a lump of dough from said molding elements, a stop above said surface adapted to successively engage the pans to hold one of the pans stationary on said moving surface in position to be charged with a lump of dough, a roller above said moving surface normally positioned in the path of the lumps of dough passing from said molding elements to the pans, and connections between said roller and stop, said roller being adapted to be deflected by the lumps of dough to initially engage and actuate said stop and release one of said pans, said roller being disengaged from said stop by further deflection thereof by a lump of dough.

13. In a dough molding machine, the combination of a plurality of dough molding elements, a continuously moving surface for carrying a series of pans to and from a position to each be charged with a lump of dough from said molding elements, a stop above said surface adapted to successively engage the pans to hold one of the pans stationary on said moving surface in position to be charged with a lump of dough, a roller normally positioned in the path of the lumps of dough passing from said molding elements to the pans and adapted to be deflected from its normal position by said lumps of dough, and means connected to said roller adapted to engage said stop upon initial deflection of the roller to actuate said stop and release the pans, said means being disengaged from said stop upon continued deflection of said roller to permit the stop to return to pan engaging position.

FRANK H. VAN HOUTEN.